2,983,756
ALIPHATIC AMINO DERIVATIVES OF BIS(p-DIALKYLAMINOPHENYL)METHANE

Frederick H. Kranz, Buffalo, N.Y., assignor to Allied Chemical Corporation, New York, N.Y., a corporation of New York No Drawing. Filed May 13, 1958, Ser. No. 734,813
9 Claims. (Cl. 260—570)

This invention relates to compounds which are derivatives of bis(p-dialkylaminoaryl)methane in which nitrogen is linked to the methane carbon atom. It relates more particularly to compounds of said type having superior properties as compared to known compounds of said general class.

An object of the present invention is to provide novel derivatives of bis(p-dialkylaminoaryl)methane, and especially of bis(p-dimethylaminophenyl)methane, in which the methane carbon atom thereof is linked to the nitrogen atom of a nitrogen-containing radical having a beneficial effect upon the properties of said derivatives.

A further object of the present invention is to provide novel bis(p-dialkylaminoaryl)methane derivatives of said type which are lightly colored or substantially colorless but which when contacted with acidic electron acceptors produce colored compositions.

Another object of the present invention is to provide novel compounds of said type having superior solubility in organic solvents and superior stability as compared to N - bis(p-dimethylaminophenyl)methyl aniline (also known as N-phenyl leucoauramine) and derivatives of the latter, when embodied in manifold record systems of the type disclosed in U.S. Patents 2,505,470 and 2,548,366, for example.

Other objects of the invention will in part be obvious and will in part appear hereinafter.

It is known that N-phenyl derivatives of leucoauramine e.g., N-(p-dimethylaminophenyl)methyl aniline, and such compounds as crystal violet lactone turn from colorless to a deep blue or violet shade, when dissolved in nonpolar solvents, such as, benzene, toluene or chlorinated biphenyl, and brought into contact with acidic electron acceptors such as kaolin, bentonite, attapulgite, silica gel, felspar, pyrophyllite, halloysite, magnesium trisilicate, zinc sulphate, zinc sulfide, calcium fluoride, and calcium citrate, as well as organic acids such as tannic acid and benzoic acid.

Compounds which are derivatives of N-bis(p-dimethylaminophenyl)methane in which the nitrogen atom of a phenylamino radical replaces one of the methane hydrogen atoms, such as N-phenyl leucoauramine, are known compounds which are colorless or substantially colorless, but which constitute color-reactants of the electron donor type, since they turn blue on coming into absorptive contact with acidic electron acceptor materials such as acidic clays (for example, attapulgite, halloysite, kaolin and bentonite), as well as aluminum sulfate, zeolite material, silica gel, magnesium trisilicate, and zinc sulphide, among others. They have been proposed for use heretofore in solution in toluene or chlorinated biphenyl for printing in color on paper or other material coated or filled with such acidic materials. Thus, they have been proposed for use in so-called "colorless carbon papers," impact printing papers and duplicating manifold record systems, for example, of the type disclosed in U.S.P. 2,505,470, wherein a solution of the N-bis(p-dimethylaminophenyl)methyl aniline is provided in the form of discrete particles in conjunction with a solid insulating material including an organic hydrophylic film-forming material and an acidic clay which, upon pressure by a stylus or impact, as by a typewriter type, causes combination of the color-forming reactant with the clay and a resulting colored mark; and, for example, of the type disclosed in U.S. Patent 2,548,366, wherein the rear surface of each top sheet of a series of overlying sheets is coated with a dispersion of a suitable solution of the N-bis(p-dimethylaminophenyl)methyl aniline in a rupturable hydrophilic colloid film, and the adjacent top surface of the next underlying sheet is coated or filled with an electron-acceptor acidic clay, so that pressure of a stylus or impact upon the top sheet causes color-formation on the surface containing the acidic clay at the points of pressure or impact.

I have discovered that a novel class of compounds, namely, aliphatic amine derivatives of bis(p-dimethylaminophenyl)methane, and related compounds, in which the nitrogen atom of a monoaliphatic amine or dialiphatic amine replaces one of the methane hydrogen atoms, possess advantageous properties which render them particularly useful in systems of the above type.

The compounds of the present invention are N-bis(p-dialkylaminoaryl)methyl amines in which the amine nitrogen atom is linked to one or two aliphatic carbon atoms derived from a primary or secondary aliphatic amine, and in which the alkyl groups of the dialkylamino radicals each have 1 to 5 carbon atoms and the aryl radicals are mononuclear aryl radicals. As employed herein, including the claims, the term "aliphatic amine" denotes and includes alkylamines, cycloalkylamines, and derivatives of alkylamines in which the hydrogen atoms are replaced by substituent atoms or groups. They include compounds which in themselves are colored (containing chromophoric groups) and compounds which are lightly colored, or colorless, or substantially colorless (free from chromophoric groups). Further, they include compounds which include in their molecules acidic groups containing a hydrogen cation (for example, a sulfonic acid or carboxylic acid radical), and compounds free from such acidic groups. In this connection it is noted that groups which do not contain a hydrogen cation, such as salts of acidic groups (e.g., alkali metal, ammonium, organic base and other salts of carboxylic and sulfonic acids) are included herein as being free from acid groups containing a free hydrogen cation.

Preferred compounds of the present invention are free from both chromophoric groups and from acidic groups containing a hydrogen cation, since such preferred compounds are lightly colored, or substantially colorless or colorless, in the solid form (leuco form), which renders them of special utility in the manufacture of impact printing and duplicating materials of the types referred to above.

The alkyl radicals of the p-dialkylamine radicals include methyl, ethyl, propyl, butyl and amyl radicals. Compounds in which they are methyl or ethyl are preferred.

The mononuclear aryl radicals include unsubstituted phenylene radicals and phenylene radicals containing one or more inert substituents such as alkyl, alkoxy, halogen or acylamino substituents; for example, tolylene, methoxy-phenylene, chlorophenylene, bromophenylene, etc. Compounds in which they are mononuclear aryl hydrocarbon radicals, and especially phenylene, are preferred.

The aliphatic amine radicals of the compounds of the present invention include various types of such radicals. Thus they include amine radicals in which only one or both of the hydrogen atoms of the amino group (—$NH_2$) is replaced by an alkyl, cycloalkyl, aralkyl, or other substituted alkyl radical, a number of which are illustrated below. Preferably they are free from chromophoric groups and for acidic groups containing a hydrogen cation, which would interfere with their use as leuco electron-donor color reactants.

The N-bis(p-dialkylaminoaryl)methyl aliphatic amines of the present invention, which may also be termed aliphatic amino derivatives of bis(p-di-lower alkylaminomononuclear aryl)methanes, have the formula

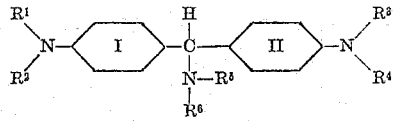

wherein $R^1$, $R^2$, $R^3$, and $R^4$ are each an alkyl radical having 1 to 5 carbon atoms (such as methyl, ethyl, propyl, butyl or amyl), $R^5$ is selected from the group consisting of alkyl radicals (such as, methyl, ethyl, propyl, butyl, amyl, hexyl, octyl, dodecyl, hexadecyl, octadecyl or octadecenyl), cycloalkyl radicals (such as, cyclopentyl, cyclohexyl, or methyl cyclohexyl), aralkyl radicals (such as, benzyl or phenylethyl), substituted alkyl, cycloalkyl and aralkyl radicals wherein hydrogen atoms of said radicals are replaced by members of the group consisting of halogen (e.g. fluorine, chlorine or bromine) and alkyl, alkoxy, aroxy, dialkylamino, acylamino, sulfamido and heterocyclic radicals (for example, cycloalkyl-alkylene, aminoalkylene, alkoxyalkyl, aminoalkylenealkoxy, aroxyalkylene, alkylene carboxylic ester, hydroxyalkylene, dihydroxyalkylene and dialkylaminoalkylene radicals), and preferably those free from chromophoric groups and from acidic groups containing a hydrogen cation, $R^6$ is selected from the group consisting of hydrogen and the radicals represented by $R^5$, and

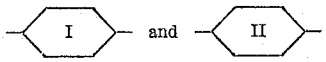

are selected from the group consisting of the phenylene radical and substituted derivatives thereof, preferably those free from chromophoric groups and from acidic groups containing a hydrogen cation (such as the alkyl, alkoxy, fluorine, chlorine, bromine, dialkylamino, acylamino or sulfamido derivatives thereof).

Those compounds are of particular value in which $R^1$, $R^2$, $R^3$ and $R^4$ are methyl or ethyl, the phenylene radicals are mononuclear aryl hydrocarbon radicals, $R^6$ is alkyl or hydrogen, and $R^5$ is alkyl.

The compounds of the present invention are soluble in a wide variety of organic solvents. Thus, they have good solubility not only in the usual solvents such as benzene, toluene, dioctylphthalate and chlorinated biphenyls, but also possess greatly superior solubility in petroleum hydrocarbon solvents such as kerosene, white mineral oil and naphthas as well as in alcoholic solvents such as alcohols and glycols. When applied as a solution in such solvents to paper or other material coated with an acidic material, such as bentonite, kaolin, felspar, mono- or dibasic barium or calcium phosphates, tannic acid or benzoic acid, they produce generally blue to violet colorations instantly; and the colored combinations thus formed are stable and fast to light. In addition, they possess relatively low volatility and high stability to air and light. These advantageous properties render the lightly colored to colorless compounds of the present invention outstanding for use in systems of the above type.

Thus, the compounds of the present invention are useful in the formation of colored compounds or differently colored compounds by contact with electron acceptor or acidic materials which cause a rearrangement of the chemical molecule of compounds of said class with intensification of the color thereof, such as those enumerated above.

Lightly colored, and especially colorless or substantially colorless, compounds of this invention are particularly useful in so-called "colorless carbon papers" and duplicating manifold record systems of the type referred to above, because of their superior solubility and stability both in the leuco form and in the colored form obtained by contact with an acidic electron acceptor. Thus, in the leuco form they are stable to storage in containers open to the atmosphere, as well as when incorporated into record sheets of the type disclosed in U. S. Patents 2,548,-366 and 2,712,507 and exposed to the atmosphere and to light. In the form of colored compounds formed by contact with acidic electron acceptors of the type referred to above, they are stable to light and to the atmosphere, even when embodied as record sheet material exposed to daylight. This is in contrast to N-phenyl leucoauramine and related compounds, which when incorporated into record sheet material of the type disclosed, for example, in U.S. Patents 2,548,366 and 2,712,507, are unstable and/or volatilize or rapidly become ineffective; and in contrast to the rapid fading of the color produced by contact of acidic clays with crystal violet lactone heretofore employed commercially. Further, they do not stain the skin when the record sheets are handled.

For example, when the compound of Example 1 of the present application is substituted for the mixture of crystal violet lactone and methylene base employed in Example 1 of U.S. Patent 2,548,366, the resulting sheets when placed one above the other, with the clay-coated surfaces upward, and marked with a stylus, a blue marking is rapidly developed on the clay-coated surface of the lower sheet where pressure was applied, which marking does not fade.

The compounds of the present invention can be prepared in various ways. The simplest method from the standpoint of availability of starting materials and apparatus required involves the condensation of a bis(p-dialkylaminoaryl)methyl hydrol having the formula

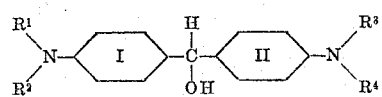

with an aliphatic amine having a free amino-hydrogen atom (a primary or secondary aliphatic amine) having the formula

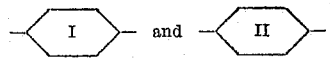

wherein $R^1$, $R^2$, $R^3$, $R^4$, $R^5$, $R^6$, having the meaning given above, preferably in substantially equimolar amounts.

This result is surprising because Michler's hydrol does not react with the amino group of secondary aromatic amines (e.g. N-methyl aniline) but forms triphenylmethane compounds; and it was heretofore considered that Michler's hydrol would not react with alkylamines.

The condensation is preferably carried out by heating in a solvent at a temperature between 80° and 150° C. (All ranges given herein, including the claims, are inclusive of the limits.)

The general method of preparation preferably consists in refluxing or autoclaving substantially equimolecular proportions of the benzhydrol and of the alkylamine in a suitable solvent having a boiling point between 80° and 150° C., at least a fraction of each of the two reactants being soluble in the solvent. Suitable solvents are for example, hydrocarbon solvents, such as petroleum hydrocarbons (such as 2,2,4-trimethylpentane and low boiling kerosene fractions), aromatic hydrocarbons (such as benzene, toluene or xylene), and mixtures preferably having a boiling range between 80° and 150° C., and alcohols, such as ethyl, propyl or butyl alcohols or mixtures thereof. When effected in a hydrocarbon solvent, water formed in the reaction is preferably removed by refluxing. The bis(p-dialkylaminoaryl)methyl amines thus obtained may be purified by recrystallization from a suitable solvent.

The following are illustrative of hydrols which are suitable for use in the process:

Michler's hydrol: 4,4'-bis(diethylamino)benzhydrol
4,4'-bis(diethylamino)benzhydrol
4,4'-bis(dipropylamino)benzhydrol
4,4'-bis(dibutylamino)benzhydrol
4,4'-bis(dimethylamino)-2,2'-dichloro-benzhydrol
4,4'-bis(dimethylamino)-3,3'-dimethyl-benzhydrol
4,4'-bis(diethylamino)-2,2'-dibromo-benzhydrol The following are illustrative of aliphatic amines which are suitable for use in the process, alone or in the form of mixtures of two or more of them:

Monomethyl amine
Dimethyl amine
Monoethyl amine
Diethyl amine
2-chloro-ethylamine
t-Amylamine
Cetylamine
Octadecylamine
Diisobutylamine
N-methyl octylamine
Ethanolamine
Hydroxyethoxyethyl amine
Ethoxyethyl ethanolamine
Benzylamine
N-methyl benzylamine
N-ethyl (4-chloro)-benzylamine
N-propyl-picolinyl amine (N-propylamino-α-methyl pyridine)
Dibenzyl amine
Trimethylene diamine
Octamethylene diamine
Cyclohexylamine
Dicyclohexylamine
Allylamine
2(4'-bromophenoxy)-ethylamine
Kerylamine
"Armeens" (mixtures of primary, secondary and tertiary aliphatic amines possessing one or more aliphatic chains ranging from 8 to 18 carbon atoms)
2-amino-1-butanol
2-amino-2-ethyl-1,3-propanediol
t-Nonylamine (a commercial product containing amines principally in the $C_9$-$C_{10}$ range)
"Primene—JM–T" (a commercial product containing amines principally in the $C_{18}$-$C_{21}$ range)
2-t-octylaminomethyl-4-t-octylphenol
N-t-butyl-β-aminoethanol
N-t-octyl-β-amino propionic acid ethyl ester
N-benzyl-N'-dimethyl ethylenediamine The invention will be illustrated by the following specific examples, but it is to be understood that it is not limited to the details thereof and that changes may be made without departing from the scope of the invention. The temperatures are in degrees centigrade and the parts and percentages are by weight, unless designated as parts by volume. Where parts are by volume, the amount signifies the volume occupied by the same number of parts by weight of water at 4° C.

*Example 1*

Into a small autoclave lined with Monel metal and equipped with a stirrer and thermometer were charged in the following order 120 parts of Michler's hydrol (90% strength—equivalent to 0.4 mol of 100%)
36.5 parts of diethylamine (0.5 mol)
500 parts by volume of toluene.

The autoclave was closed and bolted, the mixture was heated to 100° to 105° and heating was continued for 24 hours. The mixture was then removed from the autoclave and about one-half of the toluene was distilled off. The residue was cooled to about 25° and the crystals which formed were filtered off. The filter cake was dried under vacuum.

The resulting crystals of crude N-bis(p-dimethylaminophenyl)methyl diethylamine were extracted by heating to the boil in toluene, sludge filtering hot the resulting solution, then cooling the filtrate to 15° to 20°, and filtering. The purified product had a melting point of 101°–102°.

When dissolved in toluene and poured onto a surface coated with attapulgite clay, an intense blue color was produced almost instantly.

*Example 2*

Dimethylamine (22.5 parts—equivalent to 0.5 mol) was substituted for the diethylamine employed in the process of Example 1. The autoclave was closed and bolted, the mixture was heated to 100°–105° and heating was continued for 24 hours. The contents of the autoclave were distilled to remove one-half the toluene. The residual mass was cooled to room temperature (20°) and the product crystallized out. The crystals were filtered and dried in vacuum. They were purified by recrystallizing from toluene as described in Example 1. The resulting N-bis(p-dimethylaminophenyl)methyl dimethylamine was almost white in color. It melted at 94°.

When dissolved in toluene and poured onto a surface coated with attapulgite clay, a reddish blue color developed almost instantly.

*Example 3*

The following were charged to an autoclave of the type employed in Example 1:

130.4 parts of bis(4,4'-diethylamino)benzhydrol (equivalent to 0.4 mol)
22.5 parts dimethylamine (0.5 mol)
500 parts by volume of toluene.

The autoclave was closed, the mixture was heated to 100°–105° and heating continued 24 hours. The mixture was removed from the autoclave and the toluene was evaporated off on a steam bath. The residue was dissolved in 500 parts by volume of a petroleum naphtha of the type employed as a thinner (Sovasol VMP). The resulting solution was decanted from insolubles present, and the decanted liquor was cooled to 0°. The crystals which formed were filtered off, washed with a small amount of the petroleum naphtha, and the product was dried in vacuo.

The N-bis(p-diethylaminophenyl)methyl dimethylamine thus obtained was in the form of white or nearly white crystals melting at 90° to 91°. When dissolved in toluene and poured onto a surface coated with attapulgite clay, a deep reddish blue color developed instantly.

*Example 4*

Into a round bottom, three-necked flask, equipped with a stirrer, thermometer and reflux condenser provided with water separator, were charged in the following order 32.6 parts of bis(4,4'-diethylamino)benzhydrol (0.1 mol)
26.9 parts of n-octadecylamine (stearylamine—0.1 mol)
250 parts by volume of toluene.

The mixture was heated to boiling and refluxed (114°–115°) for 32 hours, the water formed by the reaction being removed by means of the separator. The reaction mass was cooled to 10° and 2 parts of a decolorizing carbon (Nuchar) were added. The mixture was then filtered and the filtrate cooled to 0°. The resulting crystals were filtered and dried under vacuum.

The N-bis(p-diethylaminophenyl)methyl octadecylamine thus obtained was in the form of white to slightly yellow crystals having a melting point of 73°. When dissolved in toluene and poured onto a surface coated with attapulgite clay, a blue color developed almost instantly, which was somewhat redder than the produced by the product of Example 5.

Example 5

The following mixture was heated to boiling and refluxed for 39 hours at 114°, as in Example 4:

30 parts of Michler's hydrol (90%=0.1 mol)
26.9 parts of stearylamine (0.1 mol)
200 parts by volume of toluene The reaction mixture was allowed to cool to room temperature and the resulting crystals were filtered off and dried.

The resulting crystalline product, N-bis(p-dimethylaminophenyl)methyl octadecylamine melted at 75°. When dissolved in mineral oil or in toluene and poured onto paper coated with bentonite, it gave a deep blue color almost instantly.

The filtrate was cooled at 0° and a second "crop" of crystals was filtered off and dried. They also melted at 75°.

Example 6

The following mixture was heated to boiling and refluxed at 102° to 104° for 5 hours, as in Example 4:

30 parts of Michler's hydrol (90%=0.1 mol)
19.6 parts of cyclohexylamine (0.1 mol)
57.3 parts by volume of benzene
142.7 parts by volume of toluene
5.7 parts by volume of glacial acetic acid The reaction mixture was then charged with 5 parts of diatomaceous filter aid ("Supercel") and sludge filtered. The filterate was cooled at 5 to 10°.

The resulting crystals were filtered off and dried. The N-bis(p-dimethylaminophenyl)methyl cyclohexylamine thus obtained was in the form of slightly gray crystals melting at 112°. When dissolved in toluene and poured onto a surface coated with bentonite clay, it produced a deep reddish blue color instantly.

Example 7

The following mixture was heated to boiling and refluxed with stirring at 104° for 8½ hours, as in Example 4:

30 parts of Michler's hydrol (90%=0.1 mol)
24.1 parts of dioctylamine (0.1 mol)
57.3 parts by volume of benzene
142.7 parts by volume of toluene
5.7 parts by volume of glacial acetic acid The mass was then cooled to 10°, charged with 5 parts of sodium carbonate (soda ash), and heated to refluxing for about a half hour. The hot reaction mixture was sludge filtered. The filtrate was cooled to 0–5° and the resulting crystals were filtered off and dried.

The resulting product, N-bis(p-dimethylaminophenyl)methyl dioctylamine, when dissolved in toluene and poured onto a surface coated with bentonite, formed a deep, pure blue color instantly.

Example 8

The following mixture was heated to boiling and refluxed with agitation at 102° for 20 hours, as in Example 4:

30 parts of Michler's hydrol (90%=0.1 mol)
6.1 parts of monoethanolamine (0.1 mol)
57.3 parts by volume of benzene
142.7 parts by volume of toluene
0.57 part by volume of glacial acetic acid.

During this period 3.8 parts by volume of water distilled off. The reaction mass was then charged with 0.5 part of sodium carbonate dissolved in 5 parts by volume of water, and further heated until the added water was distilled off. The hot mass was sludge filtered. The filtrate was allowed to cool to room temperature, crystallize for several days, and the resulting crystals were filtered off, washed with 25 parts by volume of toluene and dried in a vacuum drier at 30–35°.

The resulting crystalline product, N-bis(p-dimethylaminophenyl)methyl 2-hydroxyethylamine melted at 158°. When dissolved in toluene and poured onto a surface coated with bentonite, it gave a deep reddish blue color instantly.

Example 9

The following mixture was heated to boiling and refluxed, as in Example 8:

30 parts of Michler's hydrol (90%=0.1 mol)
13 parts of 2(4'-morpholinyl)-ethylamine
57 parts by volume of benzene
143 parts by volume of toluene
0.57 part by volume of glacial acetic acid.

During this period 2 parts by volume of water distilled off. The reaction mass was then charged with 0.5 part of sodium carbonate dissolved in 5 parts by volume of water, and further heated until the added water was distilled off. The hot mass was sludge filtered. The filtrate was slowly cooled to 0°. The resulting crystals were filtered off and dried in a vacuum drier at 30–35°.

The resulting crystalline product, N-bis(p-dimethylaminophenyl)methyl 2(4'-morpholinyl)-ethylamine melted at 125°. When it was dissolved in toluene and poured onto a surface coated with bentonite, a greenish blue color was formed instantly which turned a deep, somewhat reddish blue in a few seconds.

It will be evident to those skilled in the art that the invention is not limited to the details of the foregoing illustrative examples and that changes can be made without departing from the scope of the invention.

Thus, instead of the hydrols and aliphatic amines employed in the examples, others of those specified above may be substituted in equivalent amounts. Further, instead of the hydrol, the corresponding bis(p-dialkylaminoaryl)methyl halide (e.g. chloride or bromide) may be used.

I claim:

1. N.-bis(p-dialkylaminoaryl)methyl amine having the formula

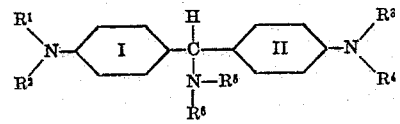

wherein $R^1$, $R^2$, $R^3$, and $R^4$ are each selected from the group consisting of alkyl radicals having 1 to 5 carbon atoms;

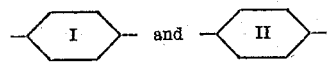

are selected from the group consisting of the unsubstituted phenylene radical and the phenylene radical monosubstituted by a member of the group consisting of lower alkyl, lower alkoxy, fluorine, chlorine, bromine, di-lower alkylamino, and $-SO_2NH_2$, $R^5$ is selected from the group consisting of alkyl and alkenyl hydrocarbon radicals having up to 21 carbon atoms; cycloalkyl hydrocarbon radicals in which the ring contains 5 to 6 carbon atoms; and substituted derivatives of said radicals in which 1 to 2 hydrogen atoms of said radicals are replaced by members selected from the group consisting of halogen, hydroxy, lower hydroxyalkoxy, lower alkoxy, lower carbalkoxy, mononuclear hydrocarbon aryl and hydroxy and halogen derivatives thereof, mononuclear hydrocarbon aroxy and hydroxy and halogen derivatives thereof, morpholino, pyridino, amino, mono- and di-lower alkylamino, and lower aminoalkylene alkoxy, and $R^6$ is selected from the group consisting of hydrogen and the radicals represented by $R^5$.

2. N-bis(p-dialkylaminophenyl)methyl amine in which the amino nitrogen atom linked to the methyl radical is part of an alkyl amine and the alkyl groups of the dialkylamino radicals each have 1 to 2 carbon atoms.

3. N - bis(p-dimethylaminophenyl)methyl amine in which the amino nitrogen atom linked to the methyl radical is part of an alkyl amine.

4. N - bis(p - dimethylaminophenyl)methyl amine in which the amino nitrogen atom linked to the methyl radical is part of a monoalkyl amine.

5. N - bis(p - dimethylaminophenyl)methyl amine in which the amino nitrogen atom linked to the methyl radical is part of a dialkyl amine.

6. N - bis(p - dimethylaminophenyl)methyl amine in which the amino nitrogen atom linked to the methyl radical is part of a cycloalkyl amine.

7. A method of producing an N-bis(p-dialkylaminoaryl)methyl amine, which comprises heating a bis(p-dialkylaminoaryl)methyl hydrol, in which the alkyl groups of the dialkylamino radicals each have 1 to 5 carbon atoms and the aryl radicals are mononuclear aryl radicals, with an amine having the formula

wherein $R^5$ and $R^6$ are as defined in claim 1, in an organic hydrocarbon solvent at 80° to 150° C.

8. A method of producing an N-bis(p-dialkylaminophenyl)methyl amine defined in claim 7 in which the alkyl groups of the dialkylamino radicals of the bis(p-dialkylaminophenyl)methyl hydrol each have 1 to 2 carbon atoms.

9. A method of producing an N-bis(p-methylaminophenyl)methyl amine in which the amino nitrogen atom linked to the methyl radical is part of an alkyl amine, which comprises heating bis(p-dimethylaminophenyl)methyl hydrol with an alkyl amine having a free aminohydrogen atom in an organic hydrocarbon solvent at 80° C. to 150° C.

References Cited in the file of this patent

UNITED STATES PATENTS

| | | |
|---|---|---|
| 2,483,434 | Rieveschl | Oct. 4, 1949 |
| 2,709,169 | Morren | May 24, 1955 |
| 2,828,341 | Adams | Mar. 25, 1958 |
| 2,828,342 | Adams | Mar. 25, 1958 |

OTHER REFERENCES

Sommelet: Comp. rend., vol. 175, pages 1149–51 (1922).

Christian: Bull. Soc. Chim. Belg., vol. 33, pp. 483–90 (1924).

Beilstein: vol. 13, p. 307 (1930).

Maxin: Bull. Soc. Chim. [s], vol. 3, pp. 1084–93 (1936), Abst. from Chem. Abst., vol. 30, p. 5989 (1936).

Loew et al.: Chem. Abstracts, vol. 39, col. 2571 (1945), abstracted from J. Pharmacol., vol. 83, pp. 120–9 (1945).

Cromwell: Jour. Amer. Chem. Soc., vol. 69, pp. 1857–60 (1947).